United States Patent [19]

Yada et al.

[11] Patent Number: 4,884,380
[45] Date of Patent: Dec. 5, 1989

[54] MOLDING AND METHOD OF PRODUCING THE SAME

[75] Inventors: Yukihiko Yada; Toshiaki Kishio, both of Aichi, Japan

[73] Assignee: Tokai Kogyo Kabushiki Kaisha, Oobu, Japan

[21] Appl. No.: 288,274

[22] Filed: Dec. 22, 1988

[30] Foreign Application Priority Data

May 17, 1988 [JP] Japan .................. 63-120385

[51] Int. Cl.⁴ .............................................. E06B 3/00
[52] U.S. Cl. ........................................ 52/208; 52/400; 296/93
[58] Field of Search ................... 52/208, 400, 716; 296/93, 201

[56] References Cited

U.S. PATENT DOCUMENTS

| | | |
|---|---|---|
| 3,851,432 | 12/1974 | Griffin . |
| 4,405,174 | 9/1983 | Yamane et al. .......... 52/208 X |
| 4,708,898 | 11/1987 | Gommier et al. ........ 52/716 X |
| 4,712,826 | 12/1987 | Omori .................... 52/208 X |
| 4,765,673 | 8/1988 | Frabotta et al. ......... 52/208 X |

FOREIGN PATENT DOCUMENTS 0124225 7/1985 Japan ....................... 296/93

Primary Examiner—Carl D. Friedman
Attorney, Agent, or Firm—Oblon, Spivak, McClelland, Maier & Neustadt

[57] ABSTRACT

A molding having connection with high strength, which comprises: two moldings connected with each other, each of the two moldings including a decorative trim portion as an outer part and being provided therein with a core material having a notched portion with at least one concave portion and at least one convex portion; and a connecting portion for connecting the two moldings, the connecting portion including a connecting decorative trim portion of which the cross sectional shape is continuously varied so as to continuously connect the cross sectional shapes of the two moldings; the respective notched portions of the two moldings being engaged with each other, and the periphery of the engaged portions being molded into one body as the connecting decorative trim portion so as to form the connecting portion. And a method of producing the same.

7 Claims, 7 Drawing Sheets

MOLDING AND METHOD OF PRODUCING THE SAME

BACKGROUND OF THE INVENTION

1. Field of the Invention

The present invention relates to a molding composing of two moldings firmly combined with each other in a portion of which the cross sectional shape of a decorative trim portion is continuously varied such as in a corner portion (a curved portion), and also relates to a method of producing the same.

2. Description of the Related Arts

A conventional molding for sealing a windshield 41 made of glass, of an automobile 4 comprises a side molding 1 for sealing the side of the windshield, an upper molding 2 for sealing the top of the same, and a corner portion S for connecting the side molding and the upper molding, as shown in FIG. 15.

In this molding, the cross sectional shape of a decorative trim portion is continuously varied at the corner portion S, as shown in FIGS. 13 and 14. In other words, the cross sectional shape gradually becomes smaller from the side molding 1 to the upper molding 2, via the corner portion S, as shown in FIGS. 13 and 14. The corner portion S is curved.

Connection of this corner portion S has conventionally been conducted by placing the upper end of the side molding 1 and the end of the upper molding 2 in a mold cavity having a shape corresponding to the cross section of the corner portion S, and injecting a corner material such as plastic into the mold cavity so as to form the corner portion. Cross sections 92—92 and 94—94 in FIGS. 13 and 14 designate cross sectional shapes of the connecting portions to the side molding 1 and the upper molding 2, respectively.

However, in the structure that the corner portion is plastically connected to the side molding and the upper molding only with plastic, the strength of the corner portion is not sufficient. Further, when a long U-shape molding connected as described above is installed on an automobile, it should be handled with care so as not to cause tension in the connecting portion formed by injection.

Further, even in the case that two moldings are connected with each other in a portion the cross sectional shape of which is continuously varied not only on such a curved surface as the corner portion mentioned above, the same problem as the above-mentioned can arise.

SUMMARY OF THE INVENTION

In view of the foregoing problem, an object of the present invention is to provide a molding having a high strength even in a portion the cross sectional shape of which is continuously varied, and a method of producing the same.

In order to achieve the above object of the present invention, there is provided a molding having connection with high strength, which comprises two moldings connected with each other, each of the two moldings including a decorative trim portion as an outer part and being provided therein with a core material having a notched portion with at least one concave portion and at least one convex portion; and a connecting portion for connecting the two moldings, the connecting portion including a connecting decorative trim portion of which the cross sectional shape is continuously varied so as to continuously connect the cross sectional shape of one of the two moldings and that of the other of the two moldings. The respective notched portions of the two moldings is engaged with each other, and the periphery of the engaged portions is molded into one body as the connecting decorative trim portion so as to form the connecting portion.

In the present invention, a decorative trim portion designates the configuration of a molding as a whole. The cross sectional shape is one in a direction perpendicular to the longitudinal direction of a molding. A core material is the so-called core metal provided inside the molding so as to maintain the center configuration of the molding. This core material can be made of not only metal but also rigid plastic.

In a connecting portion of two moldings, the above-mentioned core materials in two moldings are connected by their respective notched portions engaged with each other, and are covered with a material for a corner part such as plastic and rubber so as to form a decorative trim portion of which the cross sectional shape is continuously varied.

There's provided a method of producing the above-mentioned molding composing of two moldings which are connected with each other in a portion of which the cross sectional shape of the decorative trim portion is continuously varied. This method comprises forming a notched portion with at least one concave portion and at least one convex portion on a core material in each of the two moldings; engaging the respective notched portions of the two molding with each other by setting the concave portion in one of the two moldings and the convex portion in the other to be met; disposing the engaged portions within a cavity of a mold having a cross sectional shape corresponding to the cross sectional shape of the connecting portion for the two moldings; and injecting a material for molding into the mold cavity so as to form adecorative trim portion around the engaged portions, which continuously connects the two molding as one body.

The above-mentioned mold has a cavity corresponding to the cross sectional shape of the connecting portion. That is, it has a cross sectional shape which is continuously varied from one molding to the other molding. A material for a molding is injected into this cavity to form a connecting portion.

In a molding according to the present invention, the connecting portion thereof is so constructed that the core materials in both moldings are engaged with each other in those notched portions described above and the periphery of the engaged core materials is made secured by covering with the molding material. So, the connecting portion has high strength and exhibits an excellent joining against tensile stress. Accordingly, there can be provided a molding having high strength even in a connecting portion of which the decorative trim portion has a cross sectional shape continuously varied.

Further, according to the method of the present invention, an superior molding as described above can be obtained. In addition to a molding having a connecting portion of which the cross sectional shape is continuously varied, a molding having any connecting portion such as a curved connecting portion or a meandering one, can be obtained. cl BRIEF DESCRIPTION OF THE DRAWINGS FIGS. 1 through 11 designate a molding according to an embodiment of the present invention. FIG. 1 is a plan view of a corner portion.

FIG. 14 illustrates cross sectional views taken in the direction of the arrows along the lines 91—91 to 95—95 of FIG. 13.

DETAILED DESCRIPTION

Referring to FIGS. 1 through 12, an embodiment of the present invention applied to a molding used for an automobile windshield, will be explained.

Figure 1:
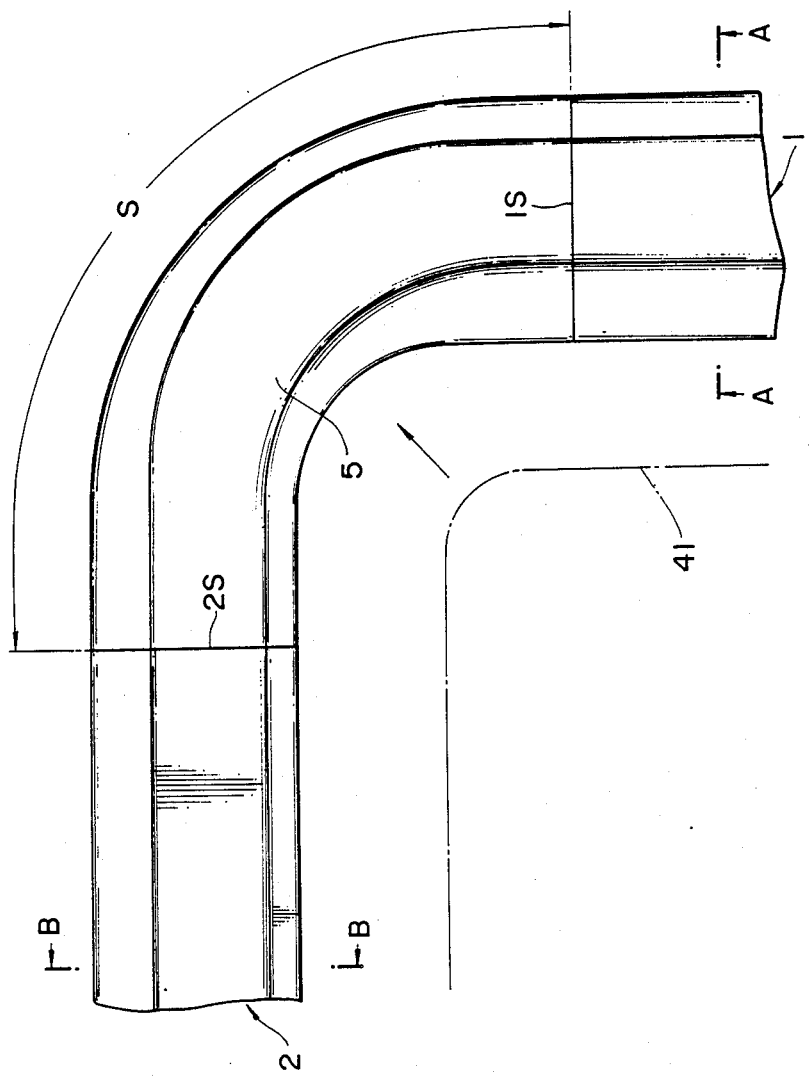
Figure 15:
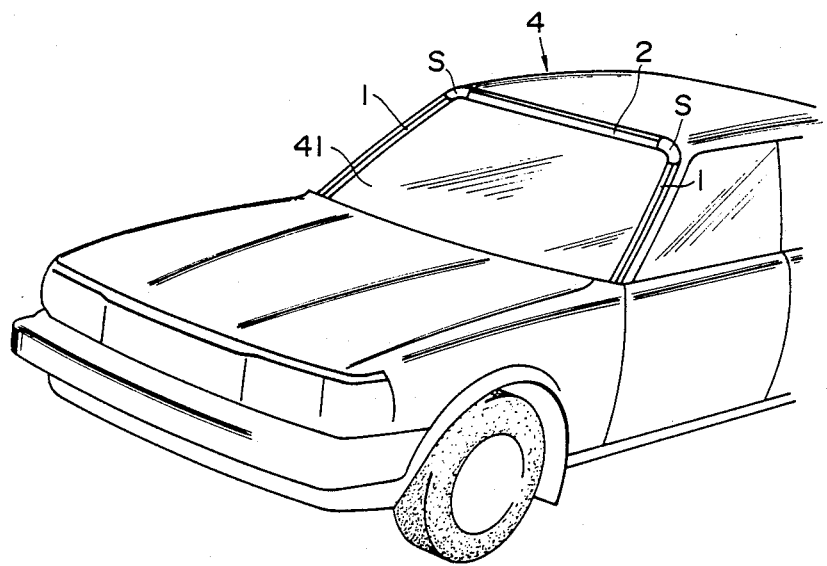
FIG. 15 is a perspective view of the front of an automobile.

This molding comprises a side molding 1, an upper molding 2, and a connecting portion 5 which connects both the moldings in a corner portion S, as shown in the plan view of FIG. 1. The corner portion S is connected with the side molding 1 and the upper molding 2, respectively, by the decorative trim portion thereof. This molding is, as shown in FIG. 15, fabricated by connecting three moldings 1,1 and 2 at the corner portions S to be U-shape, and is installed on a frame of an automobile windshield. Then, the periphery of a windshield 41 is, as shown in FIGS. 1 through 3, inserted into the inside of the molding, and both are sealed therebetween.

Figure 2:
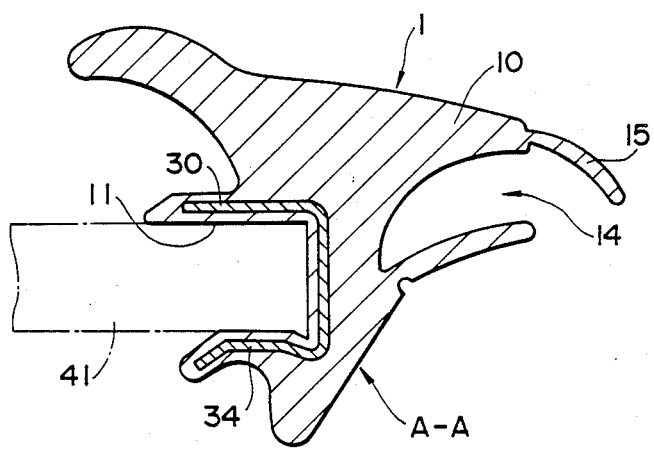
FIG. 2 is a cross sectional view taken in the direction of the arrows along the line A—A of FIG. 1.

FIG. 2 shows a cross sectional view of the side molding 1 taken in the direction of the arrows along the line A—A of FIG. 1.

The side molding 1 comprises a decorative trim portion 10 and a U-shape core metal 30 as an core material disposed in the decorative trim portion, This core metal is made of metal. The decorative trim portion 10 has a glass seal part 11 for inserting a windshield inside the core metal 30, an attachment recess 14 for fitting on the frame of an automobile windshield, a lip 15 and so forth.

Figure 3:
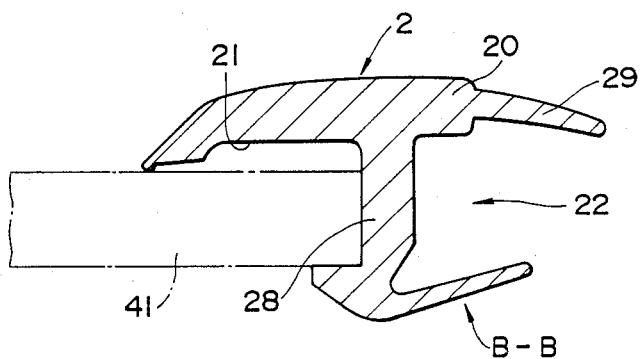
FIG. 3 is a cross sectional view taken in the direction of the arrows along the line B—B of FIG. 1.

FIG. 3 shows a cross sectional view of the upper molding 2 taken in the direction of the arrows along the line B—B of FIG. 1. The upper molding 2 compises a decorative trim portion 20 and a core material 28. This core material 28 is made of rigid plastic. The decorative trim portion 20 has a glass seal part 21, an attachment recess 22 for fitting on the frame of an automobile windshield, a lip 29 and so forth. The above-mentioned side and upper moldings are formed as one body by extruding, respectively.

Next, connection of the connecting portion 5 in the corner portion S is as follows.

Figure 4:
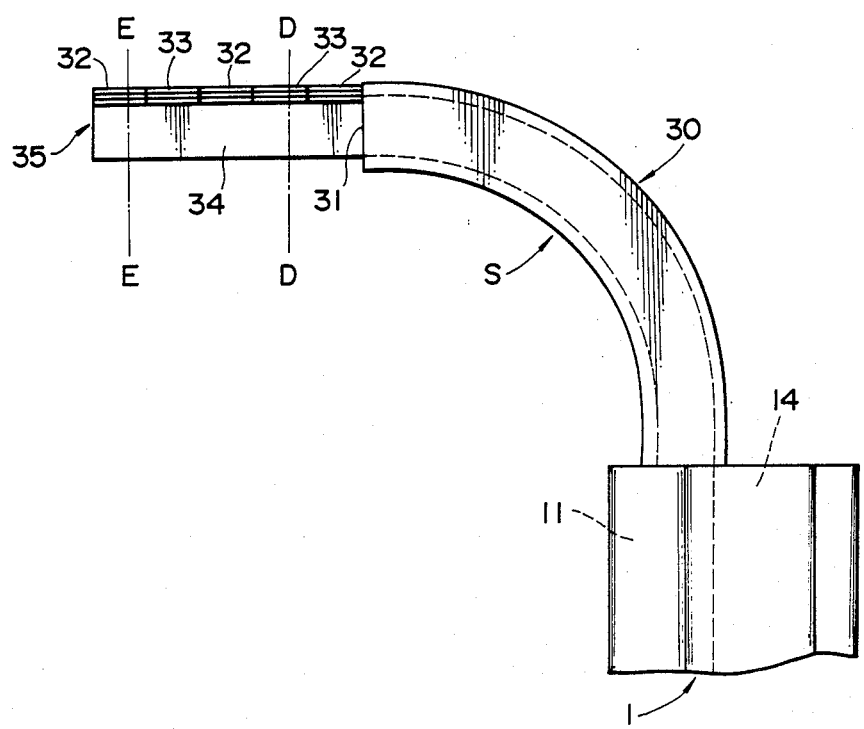
FIG. 4 is a plan view of a connecting portion in a corner portion of a side molding.
Figure 5:
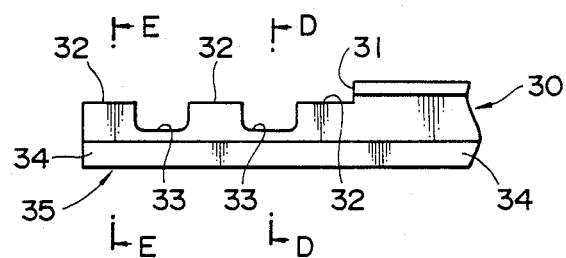
FIG. 5 is a partial side view of the same connecting portion as in FIG. 4.

In connecting, the upper part of the side molding 1 is bent in correspondence with the form of the corner portion S, as shown in FIG. 4. Then, the decorative trim portion is eliminated to leave the core metal 30 in the corner portion S. The core metal 30 has a U-shape cross section as shown in FIG. 2. Next, in the end of the corner portion S, one of the side wall 31 of the core metal 30, is cut off in the portion designated by 31 therefrom so as to have a L-shape cross section in a side view taken in the direction of the left in FIG. 4. The upper end of the part with this L-shape cross section is partially notched so as to form a notched portion 35 consisting of concave portions 33 and convex portions 32, as shown in FIG. 5. Reference numeral 34 indicates the other side wall of the core metal 3.

Figure 6:
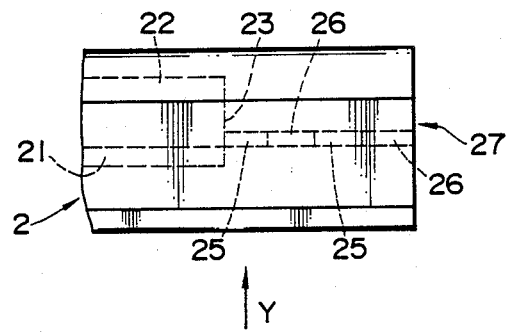
FIG. 6 is a plan view of a connecting portion in an upper molding.
Figure 7:
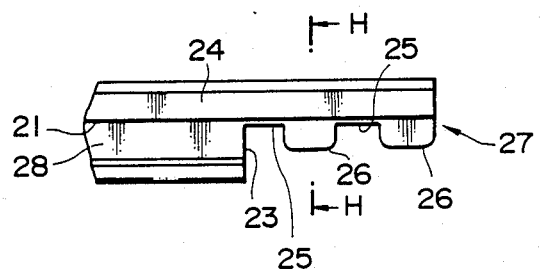
FIG. 7 is a side view from the direction indicated by the arrow Y.
Figure 8:
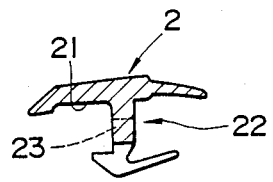
FIG. 8 is a cross sectional view taken in the direction of the arrows along the line H—H of FIG. 7.

As shown in FIGS. 6 through 8, the upper molding 2 has a notched portion 27 consisting of convex portions 26 and concave portions 25, which are formed in the end thereof by cutting off a part of the core material 28 and the lower portion thereof (shown in FIG. 8). Reference numeral 23 indicates an end surface of the cut off portion.

Figure 9:
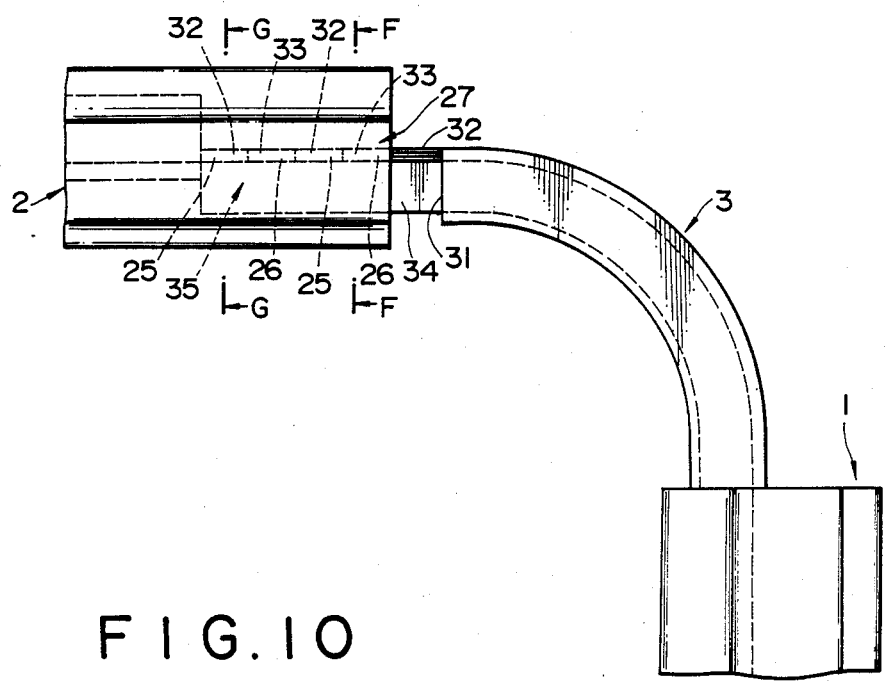
FIG. 9 is a plan view of connection between a side molding and an upper molding before injection forming.
Figure 10:
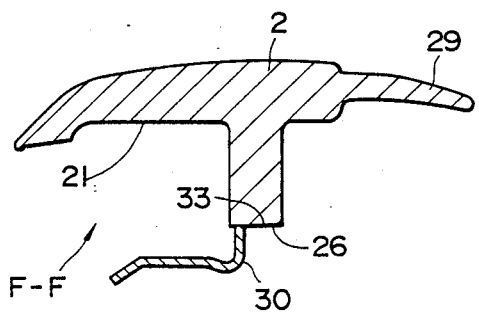
FIG. 10 is a cross sectional view taken in the direction of the arrows along the line F—F of FIG. 9.
Figure 11:
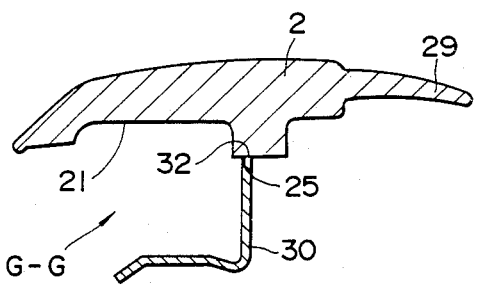
FIG. 11 is a cross sectional view taken in the direction of the arrows along the line G—G of FIG. 9.
Figure 12:
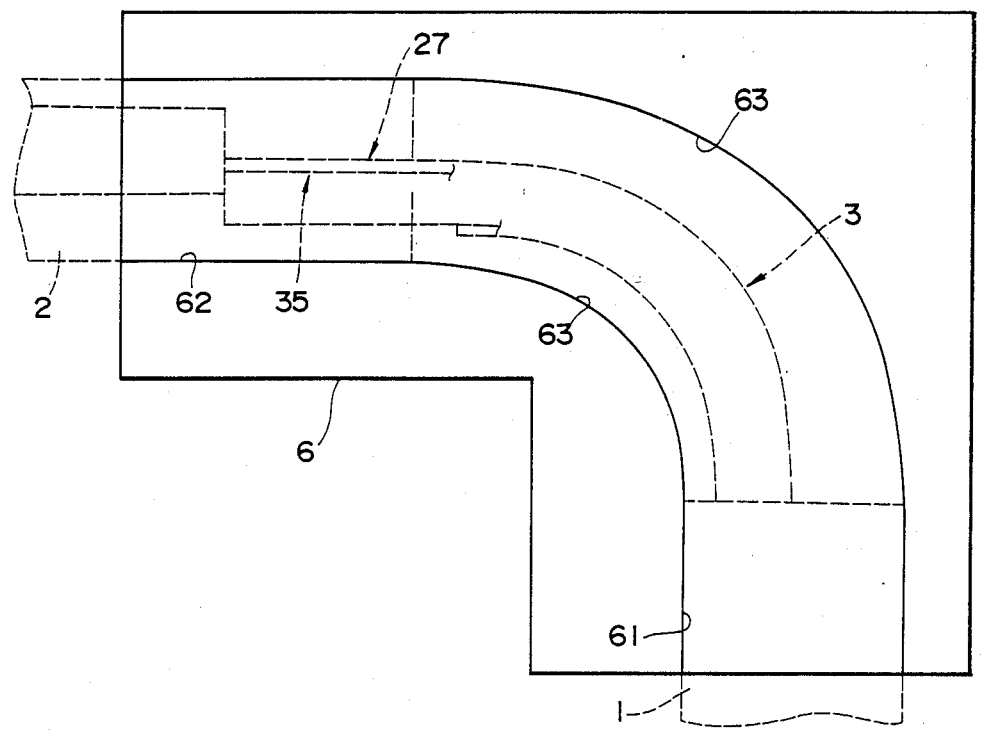
FIG. 12 is a plan view of a mold cavity.

Thereafter, as shown in FIGS. 9 through 11, the convex portions and the concave portions in the notched portions 35 of the side molding 1 and the notched portion 27 of the upper molding 2 are engaged with each other.

The moldings thus engaged are disposed in a mold 6. A cavity in a mold 6 has a corner portion cavity 63 corresponding to the cross sectional shape of the connecting portion in the corner portion S. This cavity has a cross sectional shape which is continuously varied from the end of the side molding 1 to the upper molding 2. On both ends of the corner portion cavity 63, there's further provided cavities 61 and 62 into which the ends of the side molding 1 and the uper molding 2 are disposed, respectively. Then, a plastic for molding a connecting portion is injected into the cavity of the mold 6 so as to form the corner portion S and to connect the side molding and the upper molding through the corner portion S.

Figure 13:
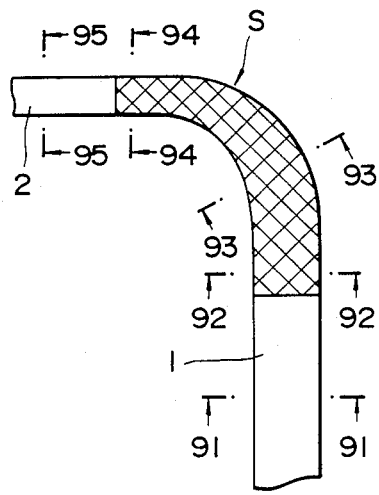
FIGS. 13 and 14 are an explanatory plan view and a cross sectional view, of a corner portion, respectively.
Figure 14:
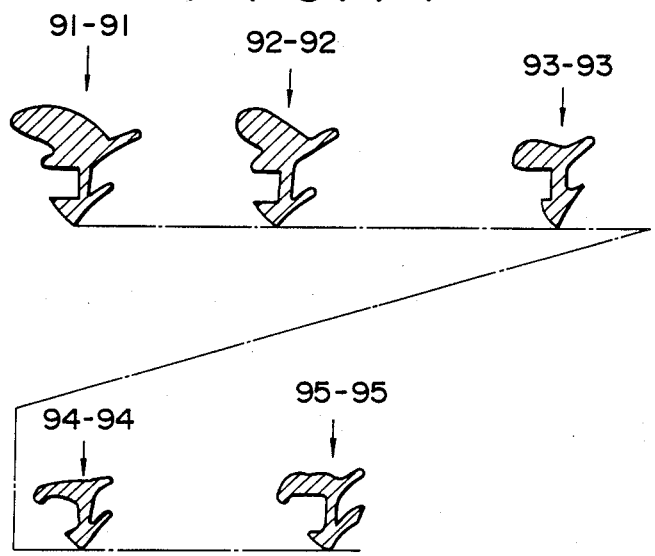

The molding thus obtained has decorative trim portion with the same cross section as shown in the abovementioned FIGS. 13 and 14 except that the core metal 30 appears in the sections 91—91 through 95—95 and the core material 28 in the section 94—94 and 95—95.

A molding according to this embodiment, as described above, has a connecting decorative trim portion constructed by engaging the respective notched portions of a core material in both moldings with each other in a corner portion where a cross sectional shape is continuously varied. Accordingly, a molding with a corner portion having high strength can be provided. This embodiment aims to connect a corner portion of which the cross sectional shape of the decorative trim portion is continuously varied, and which has a curved surface. In comparing with connection in a straight portion, it is especially difficult. According to the present invention, in such a corner portion as is difficult of connection, a connecting portion with high strength can easily be produced.

What is claimed is:

1. A molding having connection with high strength comprising:

two moldings connected with each other, each of said two moldings including a decorative trim portion as an outer part and being provided therein with a core material having a notched portion with at least one concave portion and at least one convex portion; and a connecting portion for connecting said two moldings, said connecting portion including a connecting decorative trim portion of which the cross sectional shape is continuously varied so as to continuously connect the cross sectional shape of one of said two moldings and that of the other of said two moldings;

said respective notched portions of said two moldings being engaged with each other, and the periphery of said engaged portions being molded into one body as said connecting decorative trim portion so as to form said connecting portion.

2. A molding according to claim 1, wherein a side molding for sealing the side of a windshield and an upper molding for sealing the top of the windshield is connected with each other, said side molding and said upper molding making almost a right angle with each other, and said connecting portion being curved.

3. A molding according to claim 1, wherein said decorative trim portion has a glass seal part for inserting a windshield, an attachment recess for fitting on a windshield frame, and a lip.

4. A molding according to claim 1, which is a sealing material used for an automobile.

5. A molding according to claim 4, which is a sealing material for sealing between a windshield and a frame for said windshield.

6. A molding according to claim 1, wherein said core material is made of metal or rigid plastic.

7. A molding according to claim 1, wherein said decorative trim portion is made of plastic or rubber.

* * * * *